No. 686,410. Patented Nov. 12, 1901.
A. R. LONG.
VEHICLE AXLE.
(Application filed Feb. 18, 1901.)
(No Model.)
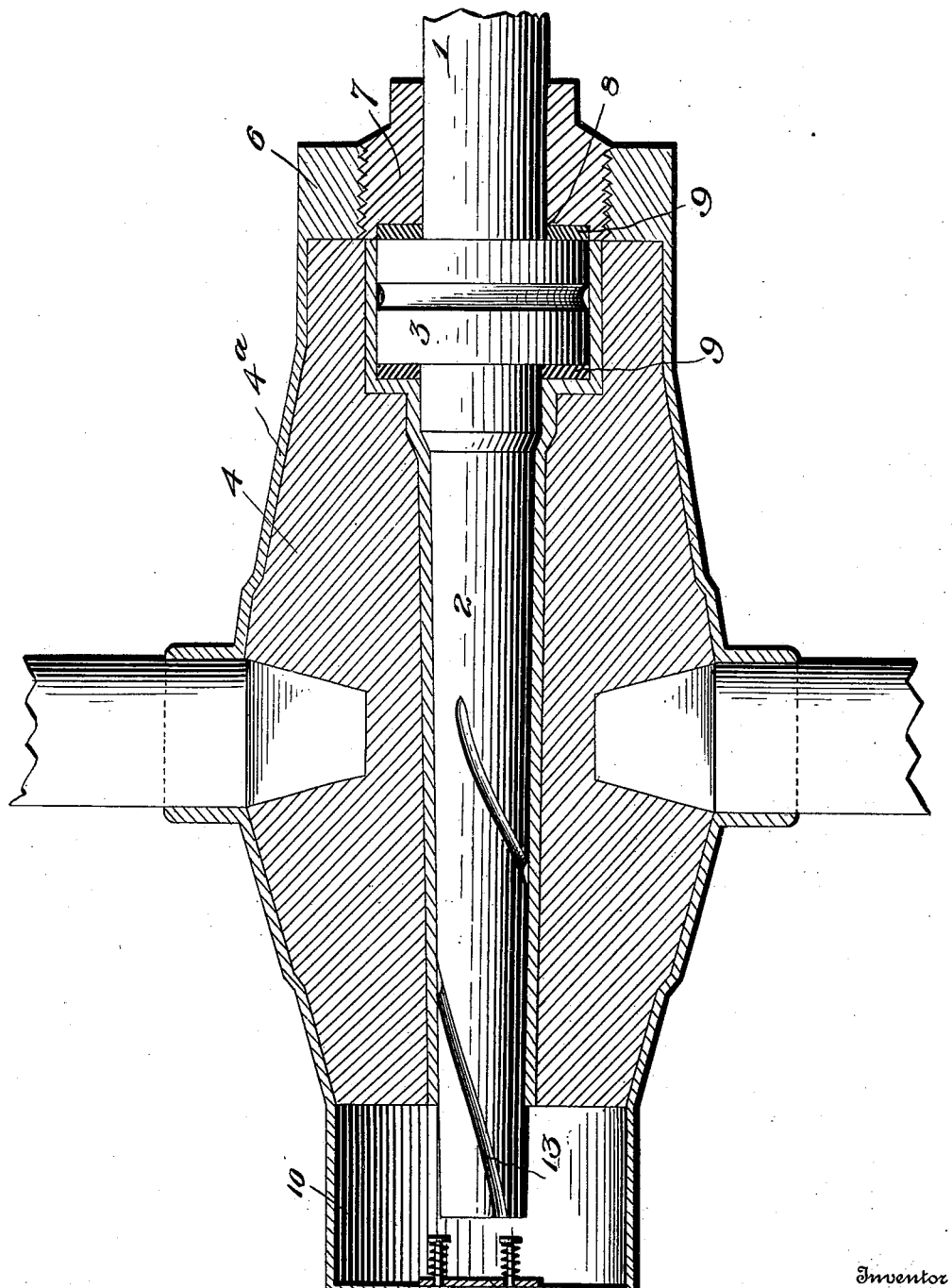

UNITED STATES PATENT OFFICE.

ARMSTEAD ROSSER LONG, OF DEKOVEN, KENTUCKY.

VEHICLE-AXLE.

SPECIFICATION forming part of Letters Patent No. 686,410, dated November 12, 1901.

Application filed February 18, 1901. Serial No. 47,802. (No model.)

*To all whom it may concern:*

Be it known that I, ARMSTEAD ROSSER LONG, a citizen of the United States, residing at Dekoven, in the county of Union and State of Kentucky, have invented certain new and useful Improvements in Vehicle-Axles; and I do declare the following to be a full, clear, and exact description of the invention, such as will enable others skilled in the art to which it appertains to make and use the same.

The invention relates to vehicle-axles.

The object of the invention is to provide a self-lubricating axle which will be dust-proof and of such construction as to prevent the waste of the lubricant.

With this and other objects in view the invention consists of certain novel features of construction, combination, and arrangement of parts, which will be hereinafter more fully described, and particularly pointed out in the appended claim.

In the accompanying drawing I have illustrated my invention in a longitudinal sectional view through the hub and axle of a vehicle.

In the drawing, 1 denotes the axle, and 2 its spindle, which is provided with an annular enlargement or shoulder 3 near its inner end or at the point of junction of the spindle with the axle.

4 denotes a hub, which is provided with an inclosing shell or sleeve 4ª, having at its inner end an annular extension 6, interiorly screw-threaded to receive a nut 7, which is provided with a recess 8, the bore of the nut being of less diameter than the enlargement or shoulder 3, whereby the hub is prevented from slipping off the spindle. Washers 9 may be used at the points indicated.

10 denotes a chamber for the lubricant. This chamber is formed by an integral extension at the outer end of shell 4ª and is provided with a filling-aperture 11, guarded by a spring-actuated valve 12, opening inwardly and held normally pressed against the outer wall of the chamber to close the aperture. The outer end of the spindle projects within this chamber and is provided with a spiral groove 13, which extends to about centrally the length of the spindle and feeds the oil contained within the chamber to the hub. When it is desired to fill the chamber, the spout of the oil-can is inserted through the filling-opening 11, the valve 12 is pressed inward, and the oil allowed to run into the chamber until its level reaches the lowermost point in the circumference of the spindle.

From the foregoing description, taken in connection with the accompanying drawing, the construction, operation, and advantages of my invention will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

The combination with an axle-spindle provided with an annular shoulder or enlargement and an oil-feed groove, of a hub provided at its inner end with a chamber to receive the annular shoulder or enlargement and with an inclosing shell or sleeve provided at its inner end with an interiorly-threaded annular extension projecting beyond the inner end of the hub, and at its outer end with an integral extension projecting beyond the outer end of the hub and forming therewith an oil-chamber, into which the outer end of the spindle projects, and a nut screw-threaded into said interiorly-threaded annular extension and provided with an annular recess, the bore of the nut being of less diameter than the shoulder or recess aforesaid, substantially as described.

In testimony whereof I have hereunto set my hand in presence of two subscribing witnesses.

ARMSTEAD ROSSER LONG.

Witnesses:
JNO. F. HARTH,
LEOPOLD HARTH.